R. DANIELS.
Straw Cutter.
No. 24,446.
Patented June 21, 1859.
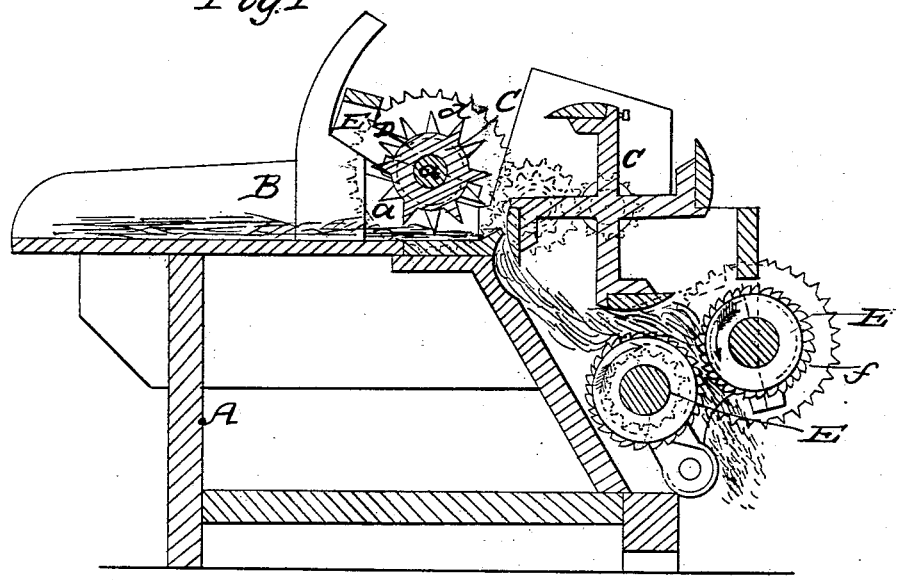
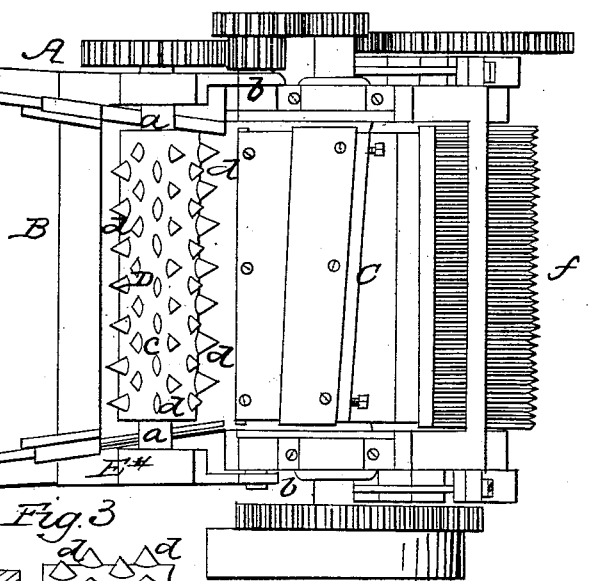
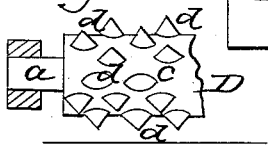

UNITED STATES PATENT OFFICE.

REUBEN DANIELS, OF WOODSTOCK, VERMONT.

STRAW-CUTTER.

Specification of Letters Patent No. 24,446, dated June 21, 1859.

*To all whom it may concern:*

Be it known that I, REUBEN DANIELS, of Woodstock, in the county of Windsor and State of Vermont, have invented a new and useful Improvement in Feed-Rollers to be Applied to Machines for Cutting Hay, Straw, Stalks, and other Fibrous Substances; and I do hereby declare that the following is a full, clear, and exact description of the same, reference being had to the annexed drawings, making part of this specification, in which—

Figure 1, is a side sectional view of a straw cutter with my invention applied to it the plane of section passing through the center. Fig. 2, a plan or top view of ditto. Fig. 3, is a detached view of a portion of a feed roller constructed according to my invention.

Similar letters of reference indicate corresponding parts in the several figures.

To enable those skilled in the art to fully understand and construct my invention I will proceed to describe it.

A, represents a framing constructed in any proper manner to support a feed box B.

C, is a cylinder of knives or cutters placed in the framing and at the discharge end of the feed box B.

The above parts in connection with a feed roller D, constitute a straw, stalk and hay cutter and with the exception of the feed roller D, constructed as hereinafter described, have been previously used.

The feed roller D, extends across the feed box B, near its discharge end and its axis $a$, is fitted in a swinging or adjustable frame E*, which works on pivots or centers $b$, at the sides of the framing A, see Fig. 2. The feed roller is formed of a cylinder $c$, the periphery of which is provided with teeth $d$, placed in longitudinal and parallel rows the teeth of alternate rows being in line with each other circumferentially with the cylinder $c$, while the teeth of the intermediate rows are also in line with each other and with the spaces between the alternate rows first mentioned. This will be understood by referring to Figs. 2 and 3. The teeth $d$, of the feed roller D, are of peculiar form and may be described as having their faces of elliptical form and gradually terminating to a point. The object is to have the teeth of convex form at all parts of their surfaces so that no angles or plane surfaces will be presented to the straw or other substance to be fed to the knives. The teeth are attached to the periphery of the cylinder $c$, with the major diameter of their bases parallel with the axis of the cylinder, as shown clearly in Figs. 2 and 3. The feed roller provided with the teeth constructed or formed as described will not catch and retain the straw or other substance which it feeds to the knives and consequently the straw or other substance will not be wound around the roller.

This invention has been practically tested and has been found to answer the desired end perfectly.

The ordinary feed rollers are corrugated and toothed so as to form angular projections which serve to catch and retain the straw or other fibrous substance to be cut, the latter if slightly bent or retained by the teeth having a tendency to wind around the roller and follow its rotation instead of permitting the roller to feed it to the knives. This difficulty is effectually obviated by my invention.

At one end of the framing A, and just below the cutters C, at the discharge end of the feed box B, two grinding cylinders E, E', are placed. The axes of these cylinders are parallel with the axis of the rotating cutter C, and the outermost cylinder E', is a little higher than the other E, as is shown plainly in Fig. 1. The cylinders E, E', are rotated in opposite directions as shown by the arrows in Fig. 1. Motion being communicated to them from the shaft $a$, of the cutters C, by the gearing, the wheels being of such relative proportion as to give the cylinder E, a greater degree of velocity than the cylinder E'. The cylinders E, E', have toothed peripheries formed by placing a series of disks $f$, on a shaft, the edges of the disks being serrated or notched similar to saw teeth with beveled sides. The disks $f$, may be of steel or chilled cast iron; the latter would probably be most generally used. For grinding it would be preferable to have the teeth with inclined sides, as a triturating surface is thereby obtained in connection with a cutting one. When however, the device is to be used for reducing or comminuting hay, straw, corn stalks and the like, the teeth may be formed with parallel sides like circular saw teeth, for in the latter case, the operation is rather of a cutting than a grinding nature. In either case, however, it is essential that the teeth of one cylinder be between or in line with the spaces between the teeth of the other, and also essential that the speed of one roller be greater than that of the other. To these conditions are due the grinding or triturating and cutting processes; without them the cylinders would act as simple crushers.

Having thus described my invention, I claim as new and desire to secure by Letters Patent—

1. The combination with the roller D, of the convex teeth (d) having the major diameter of their bases arranged parallel with the axis of the roller D, as and for the purpose herein shown and described.

2. The arrangement and combination of the roller D, cutter C, and cylinders E, E', substantially as and for the purpose herein shown and described.

REUBEN DANIELS.

Witnesses:
  CHAS. W. FRENCH,
  JOHN DANIELS.